United States Patent
Kinpara et al.

(10) Patent No.: US 6,194,864 B1
(45) Date of Patent: Feb. 27, 2001

(54) CONTROL DEVICE FOR INDUCTION MOTOR

(75) Inventors: Yoshihiko Kinpara; Miho Okuyama; Masato Koyama; Hisao Sakurai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,322

(22) Filed: May 24, 2000

Related U.S. Application Data (63) Continuation of application No. PCT/JP99/05261, filed on Sep. 27, 1999.

(30) Foreign Application Priority Data

May 25, 1999 (JP) ................................. 11-144460
Sep. 29, 1999 (JP) ................................. 10-275482

(51) Int. Cl.$^7$ ............................. H02P 5/40; H02P 5/408
(52) U.S. Cl. ...................... 318/805; 318/807; 318/808; 318/825
(58) Field of Search .................... 318/800–839, 318/798, 782, 432; 187/114, 119; 363/37, 98

(56) References Cited

U.S. PATENT DOCUMENTS

| | | | |
|---|---|---|---|
| 4,044,285 | * 8/1977 | Plunkett et al. | 318/227 |
| 4,420,719 | 12/1983 | D'Atre et al. | |
| 4,780,658 | * 10/1988 | Koyama | 318/808 |
| 5,247,237 | * 9/1993 | Koyama et al. | 318/808 |
| 5,264,773 | * 11/1993 | Koyama et al. | 318/798 |
| 5,285,029 | * 2/1994 | Araki | 187/114 |
| 5,500,581 | 3/1996 | Hatanaka et al. | |
| 5,629,597 | * 5/1997 | Imanaka | 318/805 |
| 5,650,700 | * 7/1997 | Mutoh et al. | 318/432 |
| 5,796,237 | 8/1998 | Yamakawa | |

FOREIGN PATENT DOCUMENTS

| | | |
|---|---|---|
| 3334149 | 9/1983 | (DE) . |
| 8-154393 | 6/1996 | (JP) . |
| 9-51689 | 2/1997 | (JP) . |
| 9-65700 | 3/1997 | (JP) . |
| 9-262000 | 10/1997 | (JP) . |
| 10-32990 | 2/1998 | (JP) . |

* cited by examiner

*Primary Examiner*—Paul Ip
(74) *Attorney, Agent, or Firm*—Leydig, Voit & Mayer, Ltd.

(57) ABSTRACT

An induction motor control device includes a power conversion circuit, a current sensor, a current component calculation circuit for calculating first and second current components, a magnetic flux command calculation circuit for calculating a magnetic flux command value such that the amplitude ratio between a squared value of the first current component and a squared value of the second current component takes a preset value, a voltage component calculation circuit for calculating a primary voltage component command value, and a primary voltage component command calculation circuit. The current component calculation circuit calculates first and second current components in phase and 90° out of phase with the primary voltage component command value, respectively.

4 Claims, 10 Drawing Sheets

CONTROL DEVICE FOR INDUCTION MOTOR

CROSS-REFERENCE TO THE RELATED APPLICATION

This Application is a continuation of International Application No. PCT/JP99/05261, whose International filing date is Sep. 27, 1999, and designating the United States the disclosure of which Application is incorporated by reference herein.

BACKGROUND OF THE INVENTION

1. Field of the Invention

The present invention relates to a control device for an induction motor and, more particularly, to a control device with which it is possible to keep the efficiency of an induction motor at the maximum value irrespective of its load condition.

2. Description of the Prior Art

Figure 1:
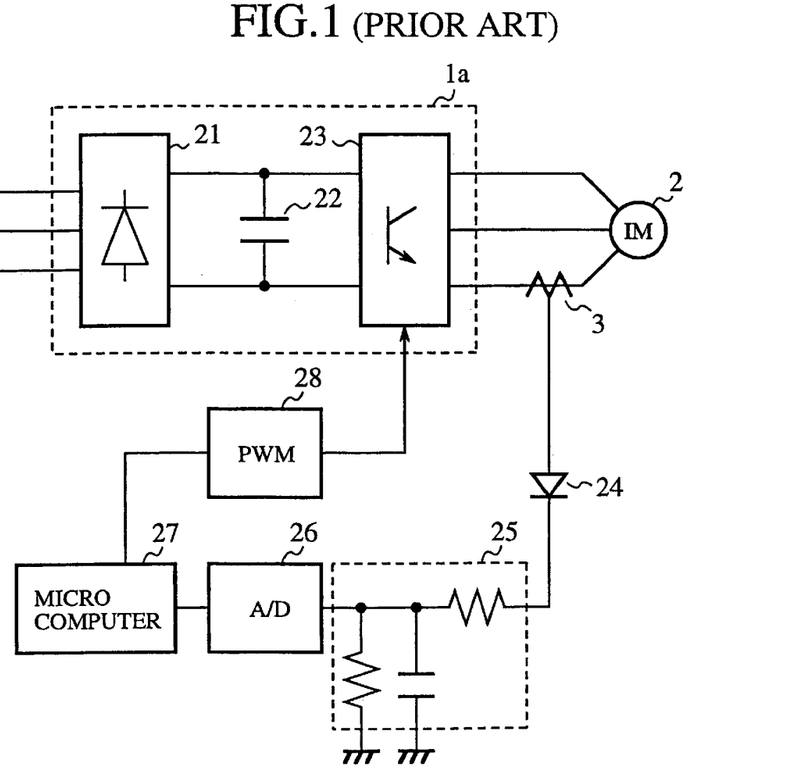
FIG. 1 is a block diagram depicting the configuration of a conventional induction motor control device.

FIG. 1 is a block diagram depicting a conventional control device disclosed, for example, in Japanese Pat. Appln. Laid-Open Gazette No. 89493/87. Reference numeral 1a denotes an inverter, 2 an induction motor, 3 a current sensor, 21 a power rectifying part, 22 a capacitor, 23 a power inverting part, 24 a rectifier, 25 a low-pass filter, 26 an A/D converter, 27 a control circuit formed by a microcomputer, and 28 a PWM (Power Width Modulation) circuit. The inverter 1a provided with the capacitor 22 is combined with the PWM circuit 28 to constitute a known voltage shift PWM inverter which functions to supply a variable voltage variable frequency, three-phase AC voltage to the induction motor 2.

Figure 2:
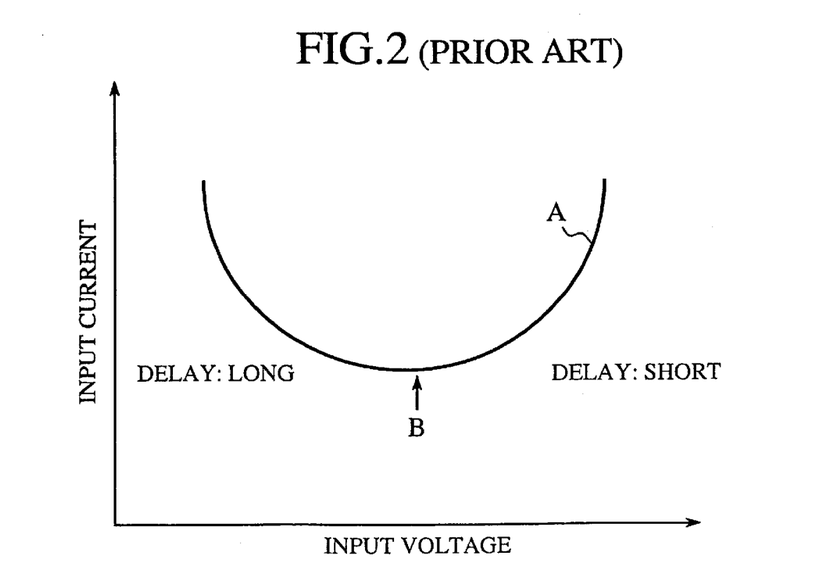
FIG. 2 is a graph explanatory of the principle of operation of a high efficiency control scheme in the conventional induction motor control device.

FIG. 2 is a diagram explanatory of the principle of operation of a high-efficiency control scheme in the conventional induction motor control. The amplitudes of an input current (primary current) and an input voltage (primary voltage) of the induction motor bear such a relationship as indicated by a characteristic curve A in FIG. 2 when the on-load torque is constant. With an input voltage raised higher than it needs to be, an exciting current increases, which causes an increase in a primary copper loss or iron loss, hence inevitably impairing the efficiency of the induction motor. Conversely, when the input voltage is lower than it needs to be, slip power increases and a secondary current increases, which causes an increase in primary and secondary copper losses, also decreasing the efficiency of the induction motor. Since the primary current of the induction motor is expressed as the sum of vectors of the exciting current and the secondary current, the loss becomes minimum at the point where the primary current becomes minimum (the point B in FIG. 2). Accordingly, the induction motor can be driven with the maximum efficiency by controlling the amplitude of the primary voltage to minimize the amplitude of the primary current.

Next, the operation of the prior art example will be described.

The primary current detected by the current sensor 3 is applied to the low-pass filter 25, from which is provided the average value of the primary current. The average value is provided via the A/D converter 26 to the control circuit 27. Based on the above-mentioned principle of operation, the control circuit 27 calculates a primary voltage command value which decreases the average value of the primary current, and provides the calculated value to the PWM circuit 28. As a result, the voltage shift PWM inverter formed by the PWM circuit 28 and the inverter 1a supplies the induction motor 2 with a primary voltage that matches the primary voltage command value provided from the control circuit 27.

Since the conventional induction motor control device detects, as described above, the primary current of the induction motor and controls the amplitude of the primary voltage in a manner to minimize the amplitude of the primary current, information necessary for control is the primary current alone, hence permitting control with an inexpensive device configuration. In the case of variable speed driving of the induction motor, however, the amplitude of the primary voltage varies with changes in a frequency command value of the voltage shift PWM inverter, it is impossible to control the amplitude of the primary voltage in such a manner as to minimize the amplitude of the primary current. On this account, the conventional control device is incapable of driving the induction motor with the maximum efficiency during variable speed operation.

Furthermore, during constant speed driving, too, when the induction motor-generated torque goes below the on-load torque due to too rapid changes in the amplitude of the primary voltage and the rotational speed of the induction motor begins to decrease, induced voltage also drops in proportion to the speed of the motor. In consequence, further reduction of the amplitude of the primary voltage leads to a decrease in the amplitude of the primary current, giving rise to a problem that the induction motor stops at the worst. To avoid this, it is necessary to make the amplitude variation of the primary voltage gentle, but in a particular use of the induction motor that involves frequent changes in the on-load torque during fixed speed driving, so it is impossible to achieve maximum efficiency driving that follows in variations in the on-load torque well.

SUMMARY OF THE INVENTION

It is therefore an object of the present invention to provide a control device which detects the primary current and allows high efficiency control of the induction motor during accelerating and decelerating driving as well as during constant speed driving and which permits high efficiency control of the induction motor without decreasing control stability, even in an abrupt or substantial changes in the on-load torque.

According to an aspect of the present invention, there is provided an induction motor control device which comprises: a power conversion circuit for generating a variable voltage variable frequency, AC primary voltage to drive an induction motor; a current sensor for sensing the primary current which is supplied from the power conversion circuit to the induction motor; a current component calculation circuit for calculating first and second current components from the primary current and a preset frequency command value of the AC primary voltage; a magnetic flux command calculation circuit for a magnetic flux command value such that the amplitude ratio between squared values of the first and second current components takes a predetermined value; a voltage component command calculation circuit for calculating a primary voltage component command value from the frequency command value and the magnetic flux command value; and a primary voltage command calculation circuit for calculating a primary voltage command value for the induction motor from the frequency command value and the primary voltage command value and for providing the calculated value to the power conversion circuit. The current component calculation circuit is adapted to calculate first and second current components in phase and 90° out of phase with the primary voltage component command value, respectively.

With this control device, it is possible to effect high efficiency control of the induction motor during accelerated and decelerated driving as well as during constant speed driving. In the use of the induction motor which involves abrupt or substantial changes in the on-load toque, too, high efficiency driving of the induction motor can be achieved without decreasing stability. Moreover, since information necessary for control is only the primary current that is supplied to the induction motor, the control device can be constructed at low cost.

According to another aspect of the present invention, there is provided an induction motor control device which comprises: a power conversion circuit for generating a variable voltage variable frequency, AC primary voltage to drive an induction motor; a current sensor for sensing the primary current which is supplied from the power conversion circuit to the induction motor; a current component calculation circuit for calculating first and second current components from the primary current and a preset frequency command value of the AC primary voltage; a magnetic flux command calculation circuit for calculating a magnetic flux command value such that the amplitude ratio between squared values of the first and second current components takes a predetermined value, and a magnetic flux differentiation command value based on the differentiation of the magnetic flux command value; a voltage component command calculation circuit for calculating a primary voltage component command value from the frequency command value, the magnetic flux command value and the magnetic flux differentiation command value; and a primary voltage command calculation circuit for calculating a primary voltage command value for the induction motor from the frequency command value and the primary voltage command value and for providing the calculated value to said power conversion circuit. The current component calculation circuit is adapted to calculate first and second current components in phase and 90° out of phase with the primary voltage component command value, respectively With this control device, it is possible to effect high efficiency control of the induction motor during accelerated and decelerated driving as well as during constant speed driving. In the use of the induction motor which involves abrupt or sharp changes in the on-load toque, too, the responsibility of magnetic flux to the magnetic flux command improves, permitting suppression of an excess primary current caused by an abrupt change in the on-load torque and hence ensuring high efficiency driving of the induction motor with stability. Moreover, since information necessary for control is only the primary current that is supplied to the induction motor, the control device can be constructed at low cost.

According to still another aspect of the present invention, the magnetic flux command calculation circuit includes a limiter circuit which limits at least one of the maximum and minimum values of the amplitude of the magnetic flux command value.

With the provision of the limiter circuit, when the maximum value is limited, an increase of the load causes an increase in the amplitude of the primary magnetic flux at a point of the maximum efficiency. Hence, it is possible to prevent that when the primary magnetic flux does not increase as commanded due to magnetic saturation, the primary current increases and iron loss increases accordingly, resulting in impairment of efficiency. With the minimum value limited, it is possible to prevent that if the amplitude of the primary magnetic flux is made too small at the time of a light load, the magnetic flux cannot change following abrupt changes in the on-load torque resulting in a transient flow of an excess primary current.

DETAILED DESCRIPTION OF THE PREFERRED EMBODIMENTS

To facilitate a better understanding of the present invention, a detailed description will be given, with reference to the accompanying drawings, of the best mode for carrying out the invention.

Embodiment 1

Figure 3:
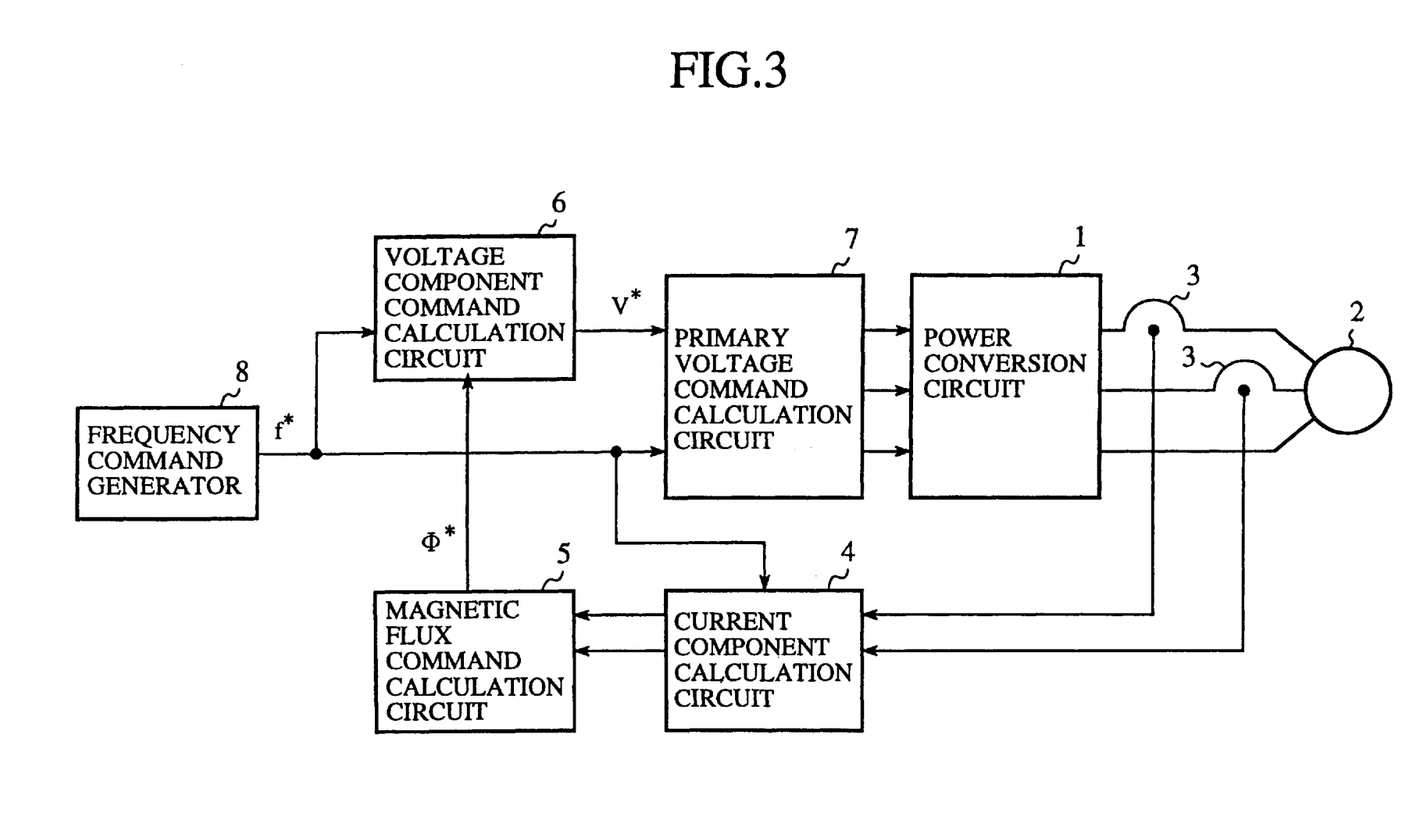
FIG. 3 is a block diagram illustrating a general configuration of an induction motor control device according to a first embodiment of the present invention.

FIG. 3 is a block diagram illustrating a general configuration of an induction motor control device according to a first embodiment (Embodiment 1) of the present invention. Reference numeral 1 denotes a power conversion circuit provided at a stage preceding an induction motor 2, for generating a variable voltage variable frequency AC voltage. The power conversion circuit 1 is comprised of, for example, the inverter 1a and the PWM circuit 28 used in the conventional device. Reference numeral 2 denotes an induction motor and 3 a current sensor, which are exactly identical with those used in the prior art device. Reference numeral 8 denotes a frequency command generator that generates a frequency command value preset, for example, by a user. Reference numeral 4 denotes a current component calculation circuit that calculates first and second current components based on the frequency command value provided from the frequency command generator 8 and the primary current to be supplied to the induction motor 2. Reference numeral 5 denotes a magnetic flux command calculation circuit connected to the current component calculation circuit 4 to calculate a magnetic flux command value based on the first and second current components. Reference numeral 6 denotes a voltage component calculation circuit connected to the magnetic flux command calculation circuit 5 and the frequency command generator 8 to calculate a primary voltage component value. Reference numeral 7 denotes a primary voltage command calculation circuit connected to the voltage component command calculation circuit 6 and the frequency command generator 8 to calculate a primary voltage command value.

Figure 4:
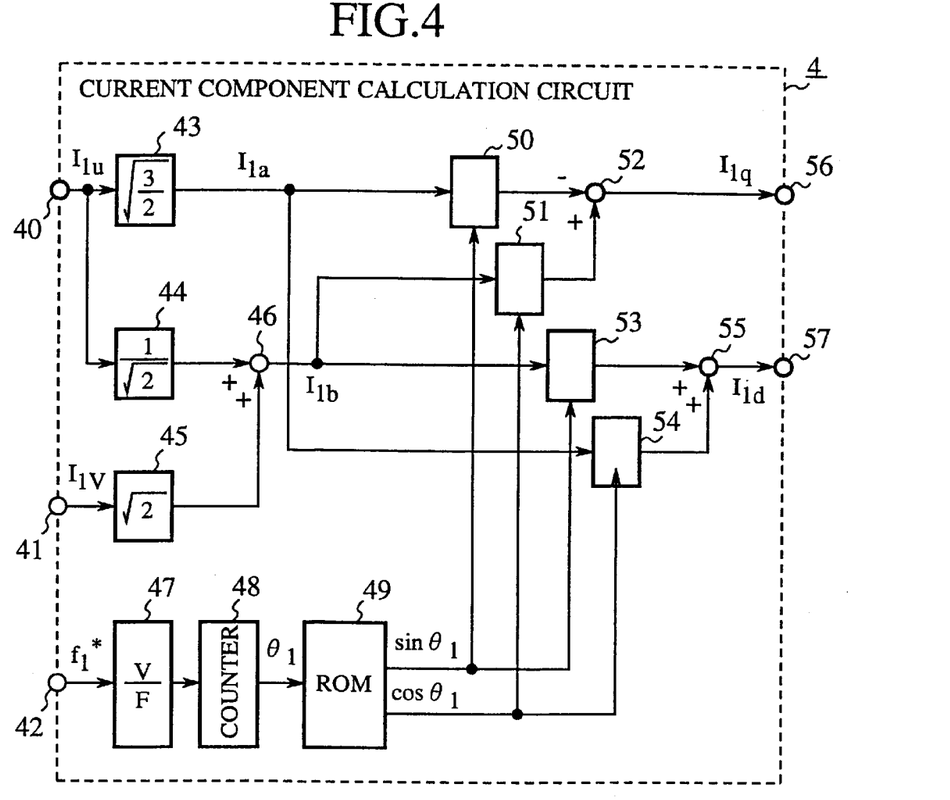
FIG. 4 is a block diagram depicting the configuration of a current component calculation circuit in the first embodiment of the present invention.

FIG. 4 is a block diagram depicting a detailed construction of the current component calculation circuit 4. The current component calculation circuit 4 comprises: input terminals 40 and 41 connected to the current sensor 3; an input terminal 42 connected to the frequency command generator 8; coefficient registers 43 to 45; adders 46 and 55; a V/F converter 47; a counter 48; a ROM 49, multiplication type D/A converters 50, 51, 53 and 54; a subtractor 52; and output terminals 56 an 57 connected to the subtractor 52 and the adder 55, respectively.

Figure 5:
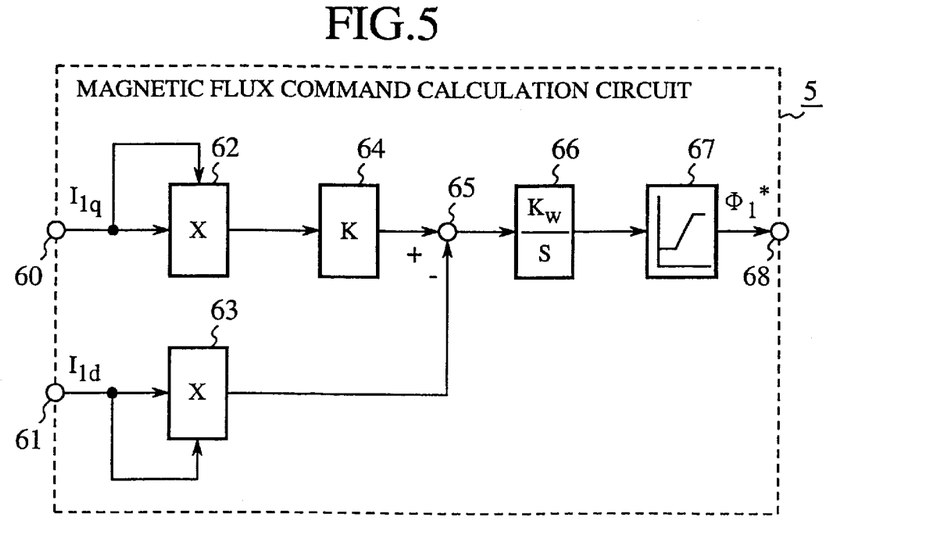
FIG. 5 is a block diagram depicting the configuration of a magnetic flux command calculation circuit in the first embodiment of the present invention.

FIG. 5 is a block diagram depicting a detailed construction of the magnetic flux command calculation circuit 5. The magnetic flux command calculation circuit 5 comprises: input terminals connected to the current component calculation circuit 4; multipliers 62 and 63; a coefficient register 64; a subtractor 65; an integrator 66; a limiter 67; and an output terminal 68 connected to the limiter 67.

Figure 6:
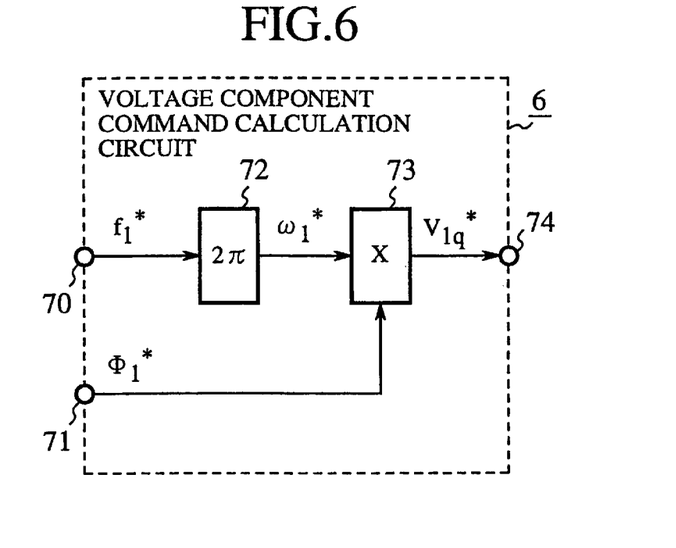
FIG. 6 is a block diagram depicting the configuration of a voltage component command calculation circuit in the first embodiment of the present invention.

FIG. 6 is a block diagram depicting a detailed construction of the voltage component command calculation circuit 6. The voltage component command calculation circuit 6 comprises: an input terminal 70 connected to the frequency command generator 8; an input terminal 71 connected to the magnetic flux command calculation circuit 5; a coefficient register 72; a multiplier 73; and an output terminal 74 connected to the multiplier 73.

Figure 7:
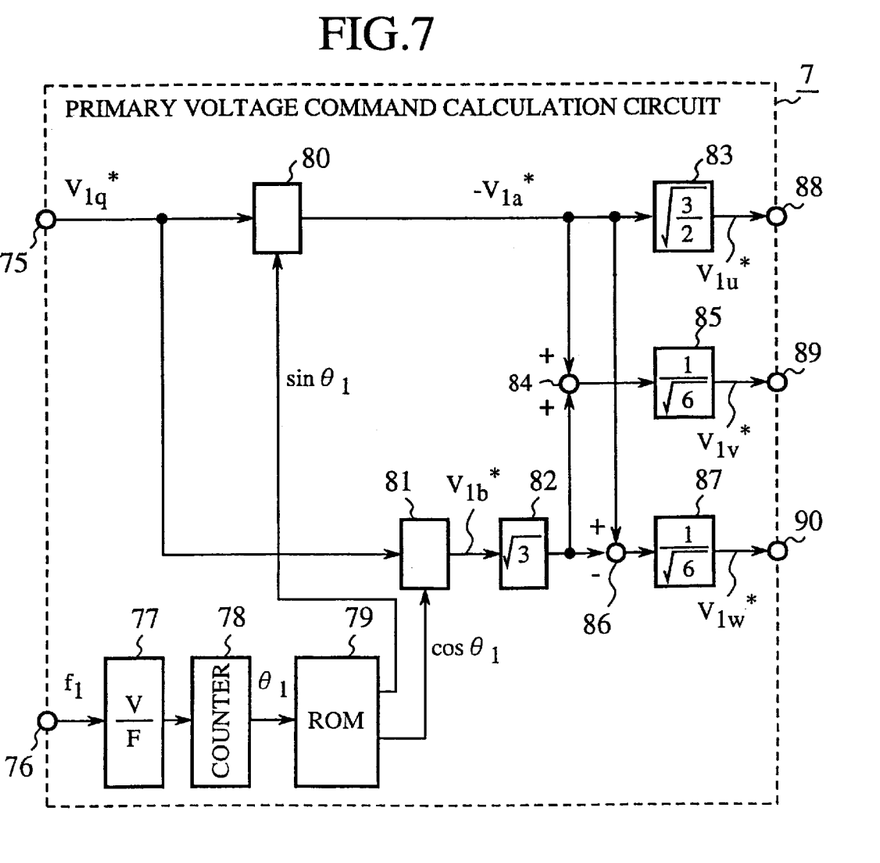
FIG. 7 is a block diagram depicting the configuration of a primary voltage command calculation circuit in the first embodiment of the present invention.

FIG. 7 is a block diagram depicting a detailed construction of the primary voltage command calculation circuit 7. The primary voltage command calculation circuit 7 comprises: an input terminal 75 connected to the voltage component command calculation circuit 6; an input terminal 76 connected to the frequency command generator 8; a V/F converter 77; a counter 78; a ROM 79; multiplication type D/A converters 80 and 81; coefficient registers 82, 83 85 and 87; an adder 84; a subtractor 86; an output terminal 88 connected to the coefficient register 83; an output terminal 89 connected to the coefficient register 85; and an output terminal 90 connected to the coefficient register 87.

Before entering into a description of the operation of Embodiment 1, a high efficiency control system for the induction motor according to the present invention will be described.

Among schemes for variable-speed control of an induction motor is a V/F constant control scheme. With this scheme, the amplitude $V_1$ of a primary voltage of the induction motor is controlled using the relation expressed by Equation (1).

$$V_1 = \Phi_1 \omega_1 \qquad (1)$$

where $\Phi_1$ is the amplitude of a primary magnetic flux and $\omega_1$ is a primary angular frequency ($=2\pi f_1$, where $f_1$ is a primary frequency).

This indicates that the amplitude $\Phi_1$ of the primary magnetic flux of the induction motor can be controlled by making the primary voltage amplitude $V_1$ proportional to the primary angular frequency $\omega_1$.

Next, a description will be given of a current component calculation scheme according to the present invention.

As is well-known in the art, primary currents $I_{1u}$, $I_{1v}$ and $I_{1w}$ that are supplied to the induction motor 2 can be transformed to components $I_{1a}$ and $I_{1b}$ on orthogonal coordinate axes (hereinafter referred to as a-b coordinate axes) through the use of the relation expressed by Equation (2).

$$I_{1a} = \sqrt{2/3} \cdot I_{1u}$$

$$I_{1b} = I_{1u}/\sqrt{2} + \sqrt{2} \cdot I_{1v} \qquad (2)$$

Furthermore, it is also well-known in the art that the current components $I_{1a}$ and $I_{1b}$ on the a-b coordinates can be transformed, using the relation expressed by Equation (3), to components $I_{1d}$ and $I_{1q}$ on rotary coordinate axes (hereinafter referred to as d-q coordinate axes) that rotate at the primary angular frequency $\omega_1$.

$$I_{1d} = I_{1a} \cos \theta_1 + I_{1b} \sin \theta_1$$

$$I_{1q} = -I_{1a} \sin \theta_1 + I_{1b} \cos \theta_1 \qquad (3)$$

(where: $\theta_1 = \int \omega_1 dt$)

On the other hand, the same relation holds for voltage as well; by deriving from Equation (2) a relation for calculating the primary voltages $V_{1u}$, $V_{1v}$ and $V_{1w}$ from the voltage components $V_{1a}$ and $V_{1b}$ on the a-b coordinate axes, we have Equation (4).

$$V_{1u} = \sqrt{2/3} \cdot V_{1a}$$

$$V_{1v} = -(V_{1a} - \sqrt{3} V_{1b})/\sqrt{6}$$

$$V_{1w} = -(V_{1u} + V_{1v}) = -(V_{1a} - \sqrt{3} V_{1b})/\sqrt{6} \qquad (4)$$

Similarly, by deriving from Equation (3) a relation for calculating the primary voltages $V_{1a}$ and $V_{1b}$ on the a-b coordinate axes from the voltage components $V_{1d}$ and $V_{1q}$ on the d-q coordinate axes, we have Equation (4).

$$V_{1a} = V_{1d} \cos \theta_1 - V_{1q} \sin \theta_1$$

$$V_{1d} = V_{1d} \sin \theta_1 + V_{1q} \cos \theta_1$$

Accordingly, assuming that the primary voltage component command value from the voltage component command calculation circuit 6 is a voltage component command value $V_{1q}*$ on the q axis, the q-axis component $I_{1q}$ of the primary current becomes a current component in phase with the primary voltage component command value, that is, the first current component. And since the d-axis component and the q-axis component are displaced 90° apart in phase, the d-axis component $I_{1d}$ of the primary current becomes a current component 90° out of phase with the primary voltage component command value, that is, the second current component.

Here, it will be understood that the d-axis component $I_{1d}$ and the q-axis component $I_{1q}$ of the primary current can be calculated from the primary currents $I_{1u}$, $I_{1v}$ and the primary frequency $f_1$ by Equations (2) and (3).

Figure 8A:
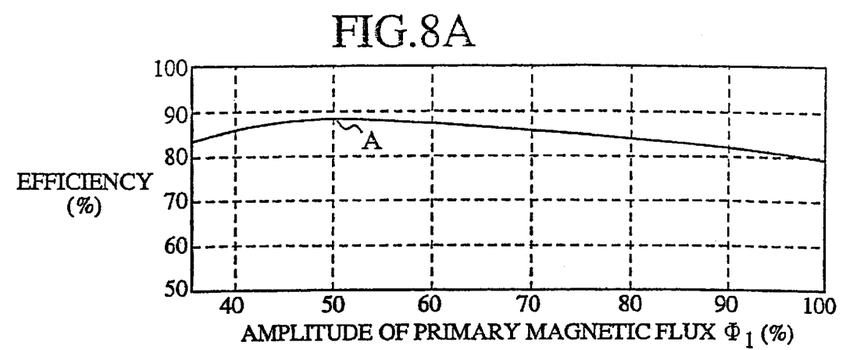
FIGS. 8(A) and 8(B) are graphs explanatory of the principle of operation of a high efficiency control scheme according to the present invention.
Figure 8B:
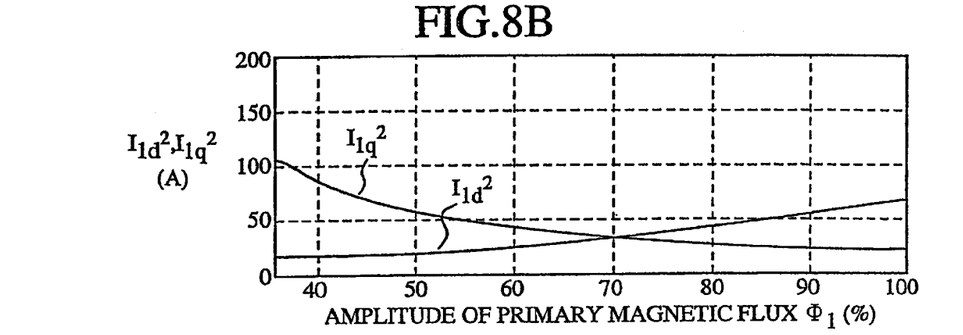

It is well-known in the art that the copper loss of the induction motor is in proportion to the squared value of current. In FIGS. 8A and 8B there are shown examples of calculation results on the relationships between the efficiency of the induction motor and the squared values of the first and second current components in the case where the primary frequency $f_1$ of the induction motor was set at 60 Hz (constant), its generated torque was set at 20% of the rated torque (constant) and the amplitude $\Phi_1$ of the primary magnetic flux was varied. The calculations were conducted taking into account the copper and the iron loss. The primary voltage component command value $V_{1q}*$ was calculated using the relation given by Equation (1), and it was supposed that the primary voltages $V_{1u}$, $V_{1v}$ and $V_{1w}$ obtained using Equations (4) and (5) were applied to the induction motor. In this case, $V_{1d}*=0$.

It is understood from FIGS. 8A and 8B that the relationship between the squared values of the first current component $I_{1q}$ and the second current component $I_{1d}$ is uniquely determined when the efficiency of the induction motor becomes maximum. That is, the efficiency of the induction motor becomes maximum at the point A as shown, but at this time, since $I_{1q}^2=62A$ and $I_{1d}^2=21A$, the value of the amplitude ratio K $(=I_{1d}^2/I_{1q}^2)$ of the squared value of the secondary current component $I_{1d}$ to the squared value of the primary current component $I_{1q}$ is 0.34 (=21/62). Accordingly, it will be seen that the efficiency of the induction motor will be maximized by controlling the amplitude $\Phi_1$ of the primary magnetic flux so that the amplitude ratio K becomes 0.34.

Figure 9:
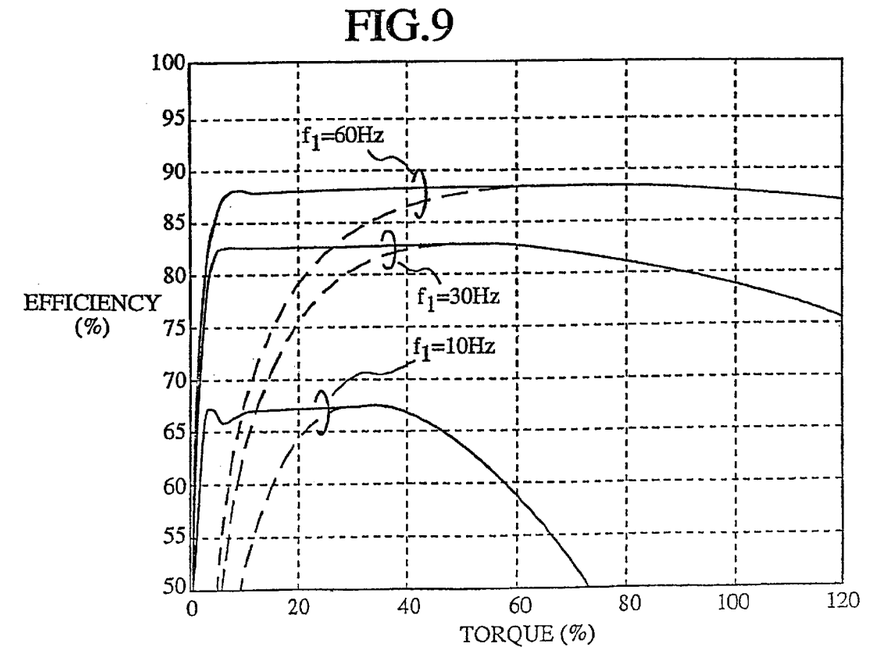
FIG. 9 is a graph showing efficiency characteristics of an induction motor by control schemes according to the first embodiment of the present invention and the prior art.

As described above, if the primary frequency and the generated torque are known, it is possible to calculate the value of the amplitude ratio K that maximizes the efficiency of the induction motor. Furthermore, as will be understood from FIG. 8, since the efficiency undergoes gentle variations in the vicinity of the maximum efficiency point (the point A), the efficiency of the induction motor does not markedly change even if the value K somewhat deviates from the value at the point of maximum efficiency. In view of this, the present inventor(s) studied through calculations how the value of the amplitude ratio K for maximization of the induction motor efficiency would change when the primary frequency and the generated torque were changed. As the result of the studies, it was clarified that the changes in the value K were small. Thus, it is considered that setting the value of the amplitude ratio K constant will present no problem. In FIG. 9, there are indicated by the solid lines the results of calculations on the efficiency of the induction motor in the case where the primary frequency $f_1$ and the generated torque were changed while holding the value of the amplitude ratio K constant (0.34). In FIG. 9 there are also indicated by the broken lines, for comparison, efficiency characteristics obtained by the conventional V/F control scheme with the amplitude value $\Phi_1$ of the primary magnetic flux held constant at the rated value. From FIG. 9 it is understood that even if the value of the amplitude ratio K is set constant, the scheme of the present invention achieves substantial improvement in the efficiency as compared with the conventional V/F control scheme.

Moreover, according to this control scheme, at the time of a light load the amplitude of the primary magnetic flux of the induction motor decreases, which causes a decrease in the primary current and hence a decrease in the copper loss and iron loss, thereby improving the efficiency. On the other hand, when the load increases, the amplitude of the primary magnetic flux at the point of maximum efficiency increases. As a result, when the primary magnetic flux does not increases as commanded due to magnetic saturation, the primary current increases, which causes an increase in the copper loss, presenting the problem of decreased efficiency. This could be avoided by setting a limit on the amplitude value $\Phi_1$ of the primary magnetic flux. In FIG. 9 the maximum value of the primary magnetic flux command value $\Phi_1*$ by the control scheme of the present invention is used as the rated value. Hence, when the load on the induction motor increases, the control scheme of the present invention and the conventional V/F control scheme provide the same efficiency characteristics. Besides, for the reasons given later on, the minimum value is set on the primary magnetic flux command value $\Phi_1*$. On this account, the control scheme of the present invention causes a decrease in the efficiency of the induction motor at the time of a very light load.

Figure 10A:
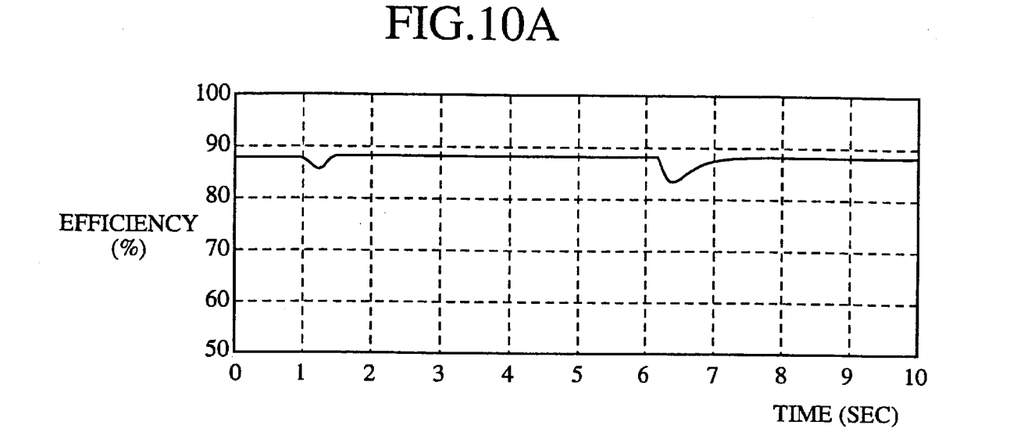
FIGS. 10(A), 10(B) and 10(C) are graphs showing response waveforms generated at the time of abrupt stepwise variations in the on-load torque in a high efficiency control system according to the first embodiment of the present invention.
Figure 10B:
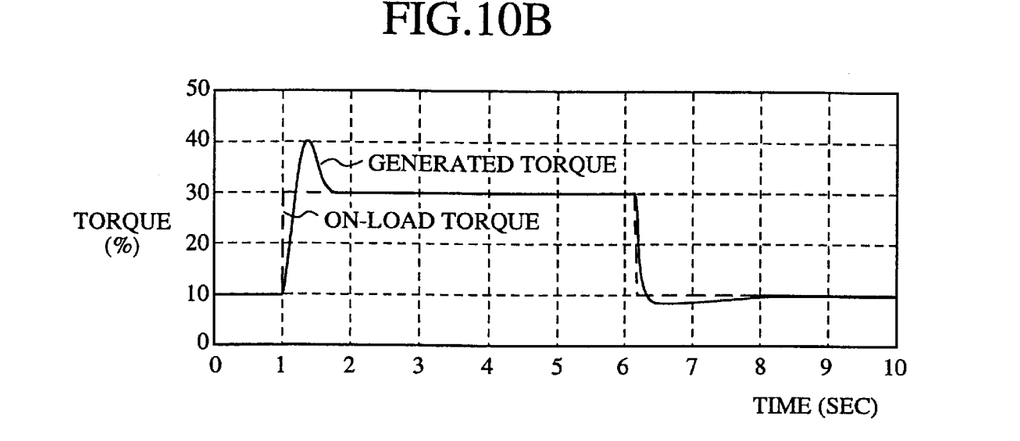
Figure 10C:
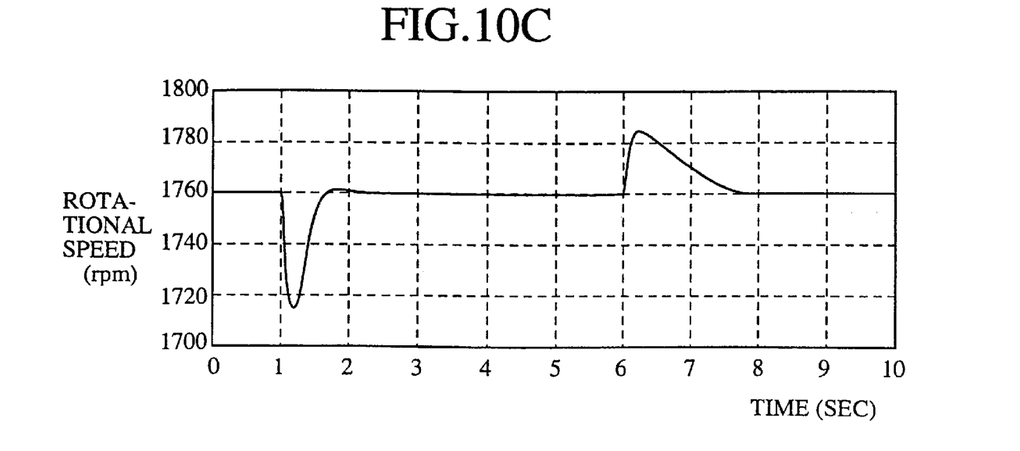

In FIGS. 10A–10D there are depicted examples of response waveforms generated when the on-load torque was sharply changed on a stepwise basis. In FIG. 10A, 10B and 10C show temporal variations in the efficiency, torque and rotational speed of the induction motor, respectively. FIGS. 10A–10C depicts response waveforms obtained when the on-load torque was sharply changed stepwise between 10% and 30% at a rotational speed of 1769 rpm. From FIG. 10 it can be seen that the control scheme of the present invention implements high efficiency driving of the induction motor without impairing the stability of control even at the time of a sharp change in the on-load torque. Incidentally, the response of the primary magnetic flux to a primary voltage change has a time lag attributable to the inductance of the induction motor. Hence, if the amplitude of the primary magnetic flux is made too small at the time of a light load, the change in the primary magnetic flux cannot follow a sharp change in the on-load torque, resulting in a fear of a transient flow of an excess primary current. In such an instance, the minimum value may preferably be set on the primary magnetic flux command value $\Phi_1$.

Next, a description will be given, with reference to FIGS. 4 to 7, of the operation of Embodiment 1 described above.

Referring first to FIG. 4, the first and second current components, that is, the q-axis component $I_{1q}$ and d-axis component $I_{1d}$ of the primary current are output from the current component calculation circuit 4. Upon input thereto of the primary currents $I_{1u}$ and $I_{1v}$ from the voltage sensor 3 into the current component calculation circuit 4 via the input terminals 40 and 41, the calculation of Equation (2) is conducted by the coefficient registers 43 to 45 and the adder 46, and the a-axis component $I_{1a}$ and b-axis component $I_{1b}$ of the primary current are provided from the coefficient register 43 and the adder 46, respectively.

On the other hand, when the primary frequency command value $f_1*$, provided as an analog quantity from the frequency command generation circuit 8, is input into the V/F converter 47 via the input terminal 42, a pulse-train signal is provided therefrom which has a frequency proportional to the primary frequency command value $f_1^*$. The counter 48 calculates the angle $\theta_1$ of a digital quantity which is a time-integral value of the primary frequency command value $f_1^*$, and provides it as a readout address to the ROM 49 with the values of $\sin\theta_1$ and $\cos\theta_1$ stored therein. Then digital quantities of $\sin\theta_1$ and $\cos\theta_1$ are read out from the ROM 49.

Following this, the a-axis component $I_{1a}$ and b-axis component $I_{1b}$ of the primary current provided from the coefficient register 43 and the adder 46, respectively, and the digital quantities of $\sin\theta_1$ and $\cos\theta_1$ read out of the ROM 49 are applied to the multiplication type D/A converters 50, 51, 53 and 54, wherein they are multiplied and converted to analog form. The converter outputs are applied to the subtractor 52 and the adder 55, which perform the calculation of Equation (3), and the first and second current components $I_{1q}$ and $I_{1d}$ are provided to the output terminals 56 and 57, respectively.

Next, as depicted in FIG. 5, the primary magnetic flux command value $\Phi_1^*$ is output from the magnetic flux command calculation circuit 5. Upon input of the first and second current components $I_{1q}$ and $I_{1d}$ from the current component calculation circuit 4 into the magnetic flux command calculation circuit 5 via the input terminals 60 and 61, squared values of the respective current components are output from the multipliers 62 and 63. Then the squared value of the first circuit component $I_{1q}$ from the multiplier 62 is fed into the coefficient register 64, wherein it is multiplied by K, and the deviation of the thus multiplied first current component from the squared value of the second current component $I_{1d}$ is calculated by the subtractor 65. Furthermore, this deviation is provided to the integrator 66, which outputs the primary magnetic flux command value $\Phi_1^*$. And the command value is limited by the limiter 67 so that it will not become smaller than a predetermined minimum value and greater than a predetermined maximum value, after which the primary magnetic flux command value $\Phi_1^*$ is provided to the output terminal 68.

Thereafter, as depicted in FIG. 6, the primary voltage component command value $V_{1q}^*$ is output from the voltage component command calculation circuit 6. That is, when the primary frequency command value $f_1^*$ from the frequency command generation circuit 8 is applied to the voltage component command calculation circuit 6 via the input terminal 70, the coefficient register 72 with a coefficient value $2\pi$ set therein outputs a primary angular frequency command value $\omega_1^*$. Then the calculation of Equation (1) is conducted by the multiplier 73 for the primary magnetic flux command value $\Phi_1^*$ fed from the magnetic flux command calculation circuit 6 via the input terminal 71 and the above-mentioned primary angular frequency command value $\omega_1^*$, and the primary voltage component command value $V_{1q}^*$ is provided to the output terminal 74.

Next, as depicted in FIG. 7, primary voltage command values $V_{1u}^*$, $V_{1v}^*$ and $V_{1w}^*$ are output from the primary voltage command calculation circuit 7. That is, it is supplied with the primary voltage command value $V_{1q}$ from the voltage component calculation circuit 6 via the input terminal 75. On the other hand, when it is supplied with the primary frequency command value $f_1^*$ from the frequency command generation circuit 8 via the input terminal 76, digital values of $\sin\theta_1$ and $\cos\theta_1$ are output from the ROM 79 through the same operation as in the above-mentioned current component calculation circuit 4.

And, when the primary voltage command value $V_{1q}^*$ and the digital values of $\sin\theta_1$ and $\cos\theta_1$ are input into the multiplication type D/A converters 80 and 81 and multiplied and converted to analog form, the calculation of Equation (5) is performed and a-axis and b-axis component command values $V_{1a}^*$ and $V_{1b}^*$ of the primary voltage are provided. In this case, however, a d-axis component command value $V_{1d}^*$ is zero. Following this, the calculation of Equation (4) is performed by the coefficient registers 82, 83, 85 and 87, the adder 84 and the subtractor 86, and the primary voltage command values $V_{1u}^*$, $V_{1v}^*$ and $V_{1w}^*$ are output via the output terminals 88 to 90, respectively.

Thereafter, upon input of these primary voltage command values $V_{1u}^*$, $V_{1v}^*$ and $V_{1w}^*$ into the power conversion circuit 1, actual values of the primary voltage for application to the induction motor 2 are controlled by known operations so that they follow these primary voltage commands.

By the operations described above, the amplitude $\Phi_1$ of the primary magnetic flux of the induction motor 2 is controlled to follow the command value $\Phi_1^*$ that is provided from the magnetic flux command calculation circuit 5. As a result, the amplitude ratio between the squared values of the first current component $I_{1q}$ and the second current component $I_{1d}$ is controlled to satisfy the relation of Equation (6).

$$\frac{I_{1d}^2}{I_{1q}^2} = K \tag{6}$$

Embodiment 2

Figure 11:
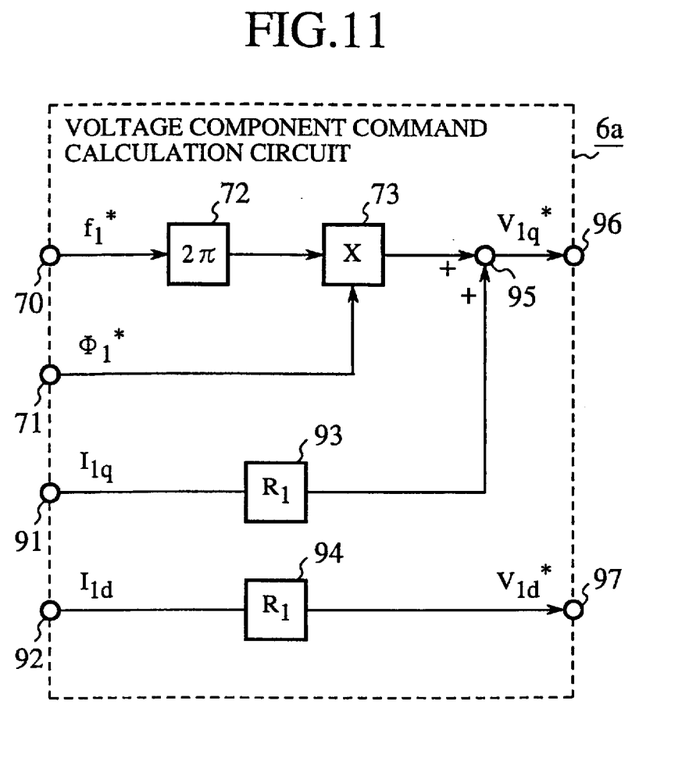
FIG. 11 is a block diagram depicting the configuration of a voltage component command calculation circuit in a second embodiment of the present invention.
Figure 12A:
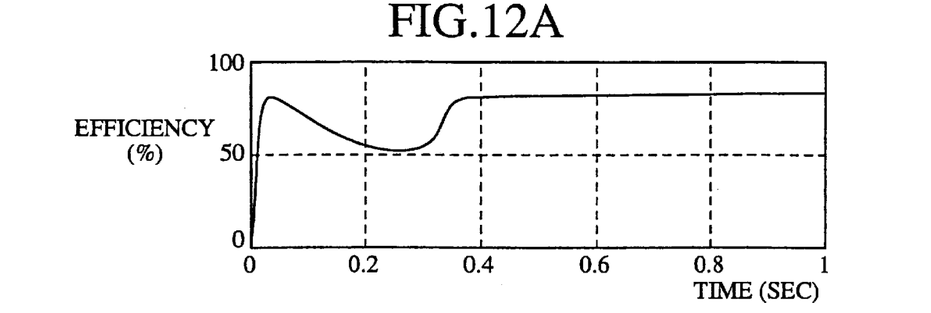
FIGS. 12(A), 12(B), 12(C) and 12(D) are graphs showing response waveforms generated at the time of abrupt stepwise variations in the on-load torque in a high efficiency control system according to the second embodiment of the present invention.
Figure 12B:
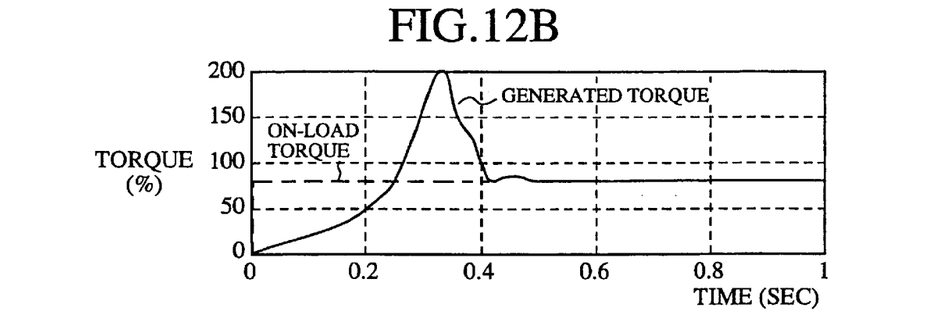
Figure 12C:
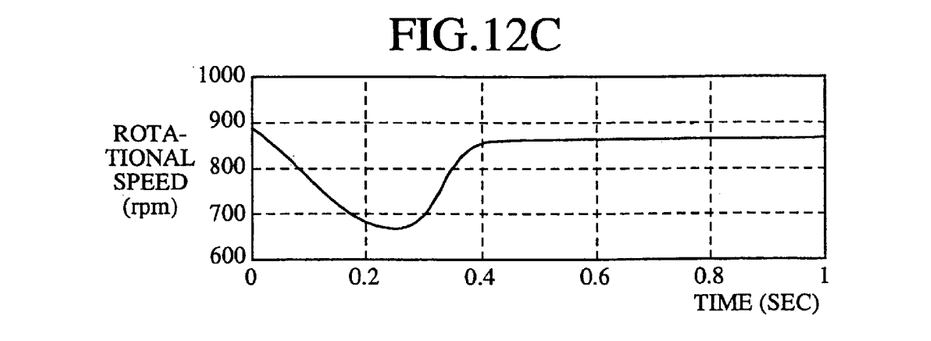
Figure 12D:
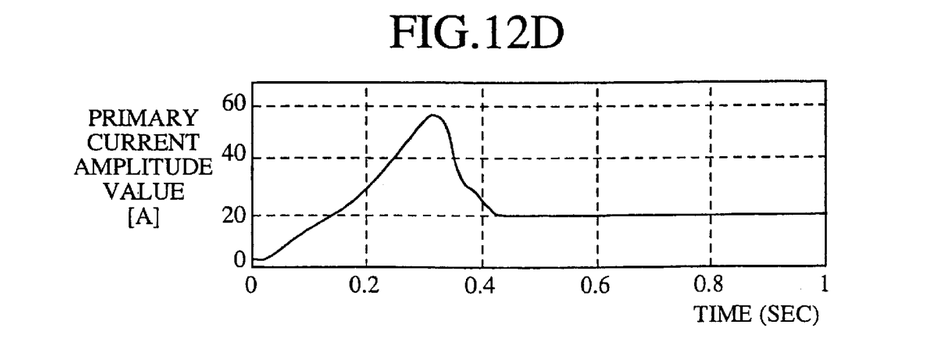

FIG. 11 is a block diagram illustrating a modified form of the voltage component command calculation circuit 6 according to a second embodiment (Embodiment 2) of the present invention. When the primary frequency $f_1$ is low, there will be a case where the amplitude $\Phi_1$ of the primary magnetic flux is not controlled as commanded due to a voltage drop by the resistance $R_1$ of the primary winding of the induction motor, resulting in a failure to achieve a desired improvement in the efficiency of the induction motor. In such an instance, it is recommended to employ the voltage component command calculation circuit 6a depicted in FIG. 11 and compensate for the above-mentioned voltage drop through utilization of the first and second current components $I_{1q}$ and $I_{1d}$ provided from the current component calculation circuit 4.

With the voltage component command calculation circuit 6a, when the first and second current components $I_{1q}$ and $I_{1d}$ from the current component calculation circuit 4 are provided via input terminals 91 and 92 to coefficient registers 93 and 94 having coefficient values equal to the primary winding resistance $R_1$ of the induction motor 2, voltage drops $R_1 I_{1q}$ and $R_1 I_{1d}$ by the primary winding resistance $R_1$ are provided. And, a q-axis voltage component command value (a voltage equal to the primary voltage component command value output from the voltage component command calculation circuit of FIG. 6) and the voltage drop $R_1 I_{1q}$ by the primary winding resistance $R_1$ from the coefficient register 93 are added together by an adder 95. The adder output is provided as the q-axis primary voltage component command value $V_{1q}^*$. On the other hand, the voltage drop $R_1 I_{1d}$ by the primary winding resistance $R_1$ is output as the d-axis primary voltage component command value $V_{1d}^*$ via an output terminal 97.

Then these q-axis and d-axis primary voltage component command values $V_{1q}^*$ and $V_{1d}^*$ are input into the primary voltage command calculation circuit 7, wherein they are converted by using the relations of Equations (4) and (5) into the primary voltage command values $V_{1u}^*$, $V_{1v}^*$ and $V_{1w}^*$, which are provided to the power conversion circuit 1.

Embodiments 3

A description will be given below of an induction motor control device according to a third embodiment (Embodiment 3) of the present invention. FIGS. 12A–12D shows examples of response waveforms generated when the on-load torque sharply changed stepwise in Embodiment 1, FIGS. 12(A), 12B, 12C and 12D depicting variations in the efficiency, torque, rotational speed and primary current of the induction motor with the lapse of time, respectively. FIGS. 10A–10C shows the case where the on-load torque was sharply changed stepwise from 1% to 80% when the rotational speed was 900 rpm.

When the minimum value of the primary magnetic flux command value $\Phi_1^*$ is chosen too small, an excess current will flow transiently as referred to previously. Then, when the rate of change in the on-load torque is high, it is recommended, for improving the transient response, that the magnetic flux command calculation circuit 5 output a magnetic flux differentiation command value $s\Phi_1^*$ in addition to the magnetic flux command value $\Phi_1^*$ and that the voltage component command calculation circuit 6 correct a magnetic flux of a flux-related differentiation term based on the primary frequency command value $f_1^*$ and the above-mentioned values $\Phi_1^*$ and $s\Phi_1^*$. The following equation holds on the coordinate axis of the induction motor that rotates in synchronization with the magnetic flux $\Phi_1$.

$$V_{1d} = R_1 I_{1d} + s\Phi_1$$
$$V_{1q} = R_1 I_{1q} + \omega \Phi_1 \qquad (7)$$

where s is a differential operator (a Laplace operator)

Then, by combining the d-axis component command value $V_{1d}^*$ of the primary voltage with the magnetic flux command value, the response of the magnetic flux $\Phi_1$ will be improved. Accordingly, it is possible to improve the responsibility of the rotational speed as well as suppress an excess primary current at the time of an abrupt change in the on-load torque.

Figure 13A:
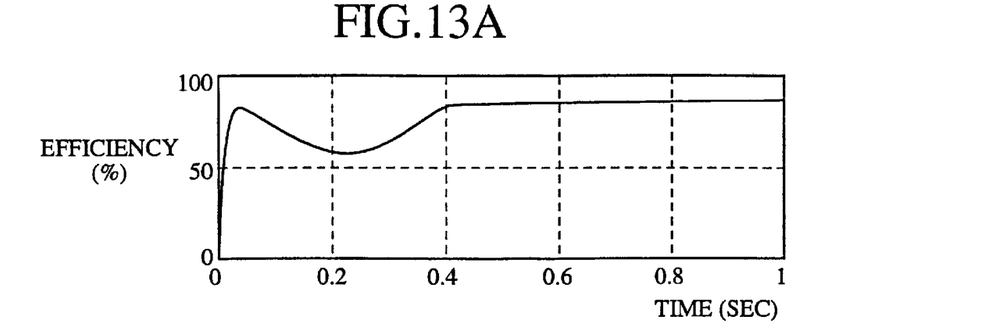
FIGS. 13(A), 13(B), 13(C) and 13(D) are graphs showing response waveforms generated at the time of abrupt stepwise variations in the on-load torque in a high efficiency control system according to a third embodiment of the present invention.
Figure 13B:
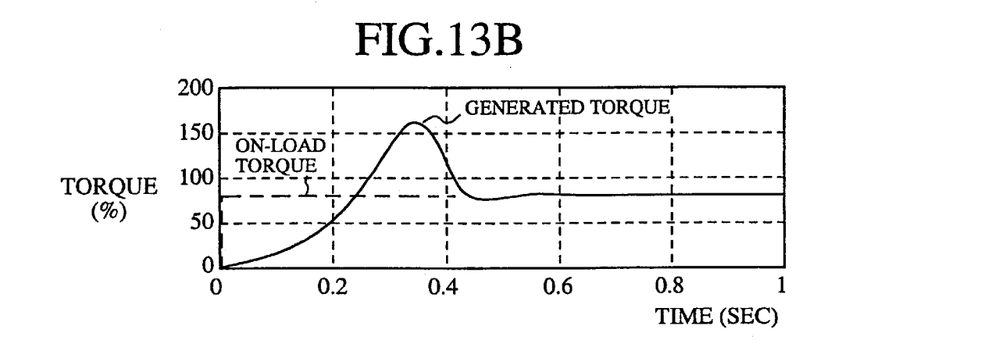
Figure 13C:
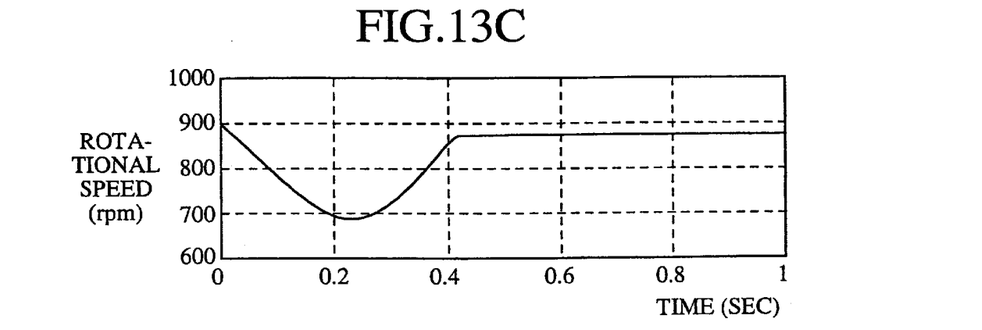
Figure 13D:
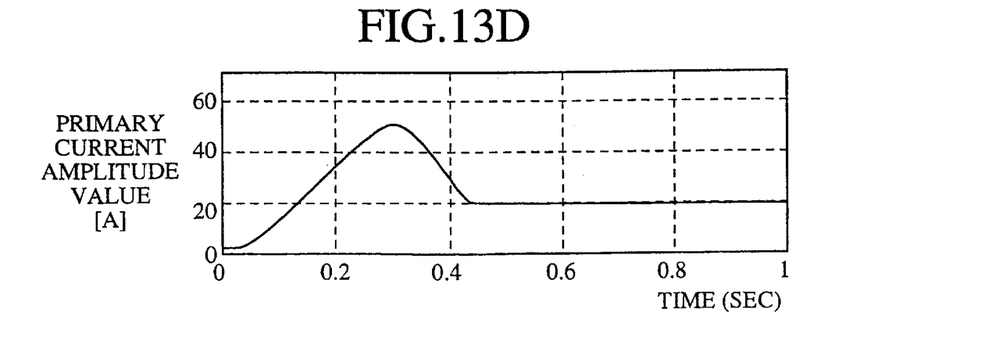

In FIGS. 13A–13D there are shown, as is the case with FIGS. 12A–12D, examples of response waveforms in the device according to Embodiment 3 of the present invention in which the d-axis primary voltage component command value $V_{1d}^*$ at the time of a load variation is combined with the magnetic flux differentiation value. FIGS. 13A, 13B, 13C an 13D depict temporal variations in the efficiency, torque, rotational speed and primary current of the induction motor, respectively. As will be seen from a comparison with FIG. 12, combining the d-axis primary voltage component command value $V_\Phi^*$ with the magnetic flux differentiation command value permits suppression of an excess primary current and improves the responsibility of the rotational speed.

Figure 14:
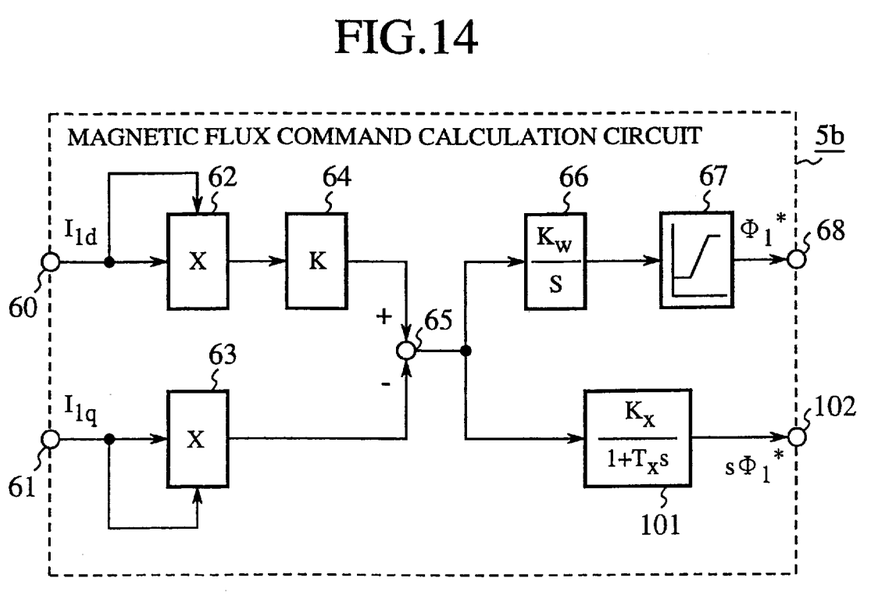
FIG. 14 is a block diagram depicting the configuration of a magnetic flux command calculation circuit in the third embodiment of the present invention.

FIG. 14 is a block diagram depicting a magnetic flux command calculation circuit 5b according to Embodiment 3 of the present invention. In FIG. 14, reference numeral 101 denotes a time-lag of first order calculator, and 102 an output terminal for the magnetic flux differentiation command value. The other parts are identical with those in Embodiment 1 and no description will be repeated thereon.

In the case where the primary magnetic flux command value $\Phi_1^*$ is present in a range in which it is not limited by the limiter 67, the input to the integrator 66 is in proportion to a differentiated value of the magnetic flux command $\Phi_1^*$. Accordingly, the magnetic flux differentiation command value needs only to be calculated based on the input to the integrator 66 (that is, the output from the subtractor 65).

The time-lag of first order calculator 101 inputs the difference between squared values of a K-multiplied first current component $I_{1q}$ and the second current component $I_{1d}$, and performs the time-lag of first order calculation expressed by the following equation.

$$s\Phi_1^* = K_x/(1+T_x s)U_1 \qquad (8)$$

where:
U$_1$=output from subtractor 65
K$_x$=preset value of gain
T$_x$=present value of time constant The result of calculation by the time-lag of first order calculator 101 is output as the magnetic flux differentiation command value $s\Phi_1^*$ via an output terminal 102.

Figure 15:
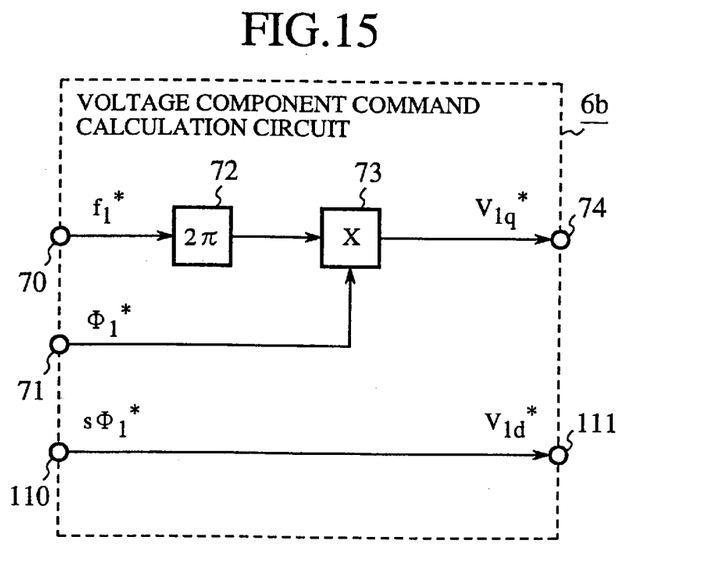
FIG. 15 is a block diagram depicting the configuration of a voltage component command calculation circuit in the third embodiment of the present invention.

FIG. 15 is a block diagram depicting a voltage component command calculation circuit 6b according to Embodiment 3 of the present invention. In FIG. 15, reference numeral 110 denotes an input terminal for the magnetic flux differential command value and 111 an output terminal for the d-axis primary voltage component command value. The other parts are identical with those in Embodiment 1 and no description will be repeated thereon.

Thus, the d-axis and q-axis primary voltage component command values $V_{1d}^*$ and $V_{1q}^*$ are output via the output terminals 111 and 74. And these q-axis and d-axis primary voltage component command values $V_{1q}^*$ and $V_{1d}^*$ are converted to the primary voltage command values $V_{1u}^*$, $V_{1v}^*$ and $V_{1w}^*$ as described previously in respect of Embodiment 2, and they are provided to the power conversion circuit 1.

With this embodiment, the responsibility of the magnetic flux to the magnetic flux command increases, and hence permits suppression of an excess primary current at the time of a substantial change in the on-load torque.

Embodiment 4

Figure 16:
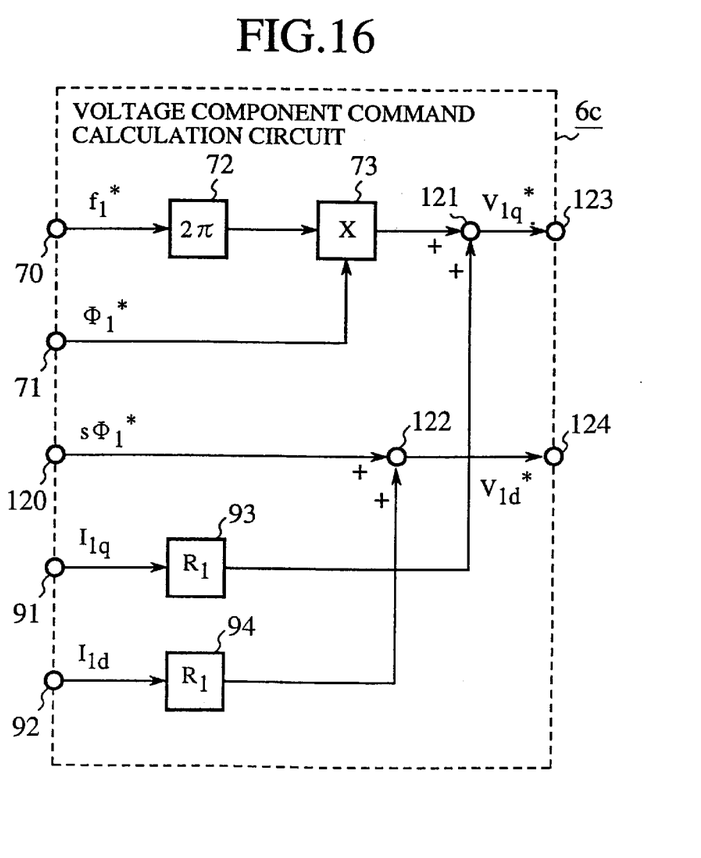
FIG. 16 is a block diagram depicting the configuration of a voltage component command calculation circuit in a fourth embodiment of the present invention.

FIG. 16 is a block diagram illustrating a modified form of the voltage component command calculation circuit 6b according to a fourth embodiment (Embodiment 4). In the case where the amplitude $\Phi_1$ of the primary magnetic flux is not controlled as commanded due to a voltage drop by the resistance $R_1$ of the primary winding of the induction motor when the primary frequency $f_1$ is low and the efficiency of the induction motor cannot be increased as desired, it is recommended to employ the voltage component command calculation circuit 6c depicted in FIG. 16 and compensate for the above-mentioned voltage drop through utilization of the first and second current components $I_{1q}$ and $I_{1d}$ provided from the current component calculation circuit 4 as is the case with Embodiment 2. In FIG. 16, reference numeral 120 denotes an input terminal connected to the magnetic flux command calculation circuit 5b, 121 and 122 adders, 123 an output terminal for the q-axis primary voltage component command value, and 124 an output terminal for the d-axis primary voltage component command value. The other parts are identical with those in Embodiment 2 of FIG. 11, and no description will be repeated thereon.

The adder 121 is used to compensate for a q-axis voltage drop $R_1 I_{1q}$ by the primary resistance defined by Equation (8), and the adder 122 is used to compensate for a q-axis voltage drop $R_1 I_{1d}$ by the primary resistance defined by Equation (7).

With this embodiment, the voltage drop by the primary winding resistance $R_1$ of the induction motor can be compensated for, and hence the amplitude $\Phi_1$ of the primary magnetic flux can be controlled as commanded even in the range over which the primary frequency $f_1$ is low; therefore, it is possible not only to improve the efficiency of the induction motor as desired but also to suppress an excess primary current when the on-load torque sharply changes.

While in the above the present invention has been described as being applied to the V/F constant control, it is needless to say that the invention is also applicable to other control schemes, for example, for vector control or fixed control of primary magnetic flux to control the magnetic flux of the induction motor.

INDUSTRIAL APPLICABILITY

As described above, the induction motor control device according to the present invention is suitable for maintaining the efficiency of the induction motor at the maximum value during accelerated/decelerated driving and at the time of substantial variations in the on-load torque.

It will be apparent that many modifications and variations may be effected without departing from the scope of the novel concepts of the present invention.

What is claimed is:

1. An induction motor control device comprising:

a power conversion circuit for generating a variable voltage, variable frequency AC primary voltage for driving an induction motor;

a current sensor for sensing a primary current supplied from said power conversion circuit to the induction motor;

a current component calculation circuit for calculating first and second current components from the primary current and a frequency command value of the AC primary voltage;

a magnetic flux command calculation circuit for calculating a magnetic flux command value such that an amplitude ratio between squared values of the first and second current components has a preset value;

a voltage component command calculation circuit for calculating a primary voltage component command value from the frequency command value and the magnetic flux command value; and a primary voltage command calculation circuit for calculating a primary voltage command value for the induction motor from the frequency command value and the primary voltage command value and for providing the primary voltage command value calculated to said power conversion circuit wherein said current component calculation circuit calculates first and second current components in phase and 90° out of phase with the primary voltage component command value, respectively.

2. The induction motor control device as claimed in claim 1, wherein said magnetic flux command calculation circuit includes a limiter circuit limiting at least one of maximum and minimum values of the magnetic flux command value.

3. An induction motor control comprising:

a power conversion circuit for generating a variable voltage variable frequency AC primary voltage for driving an induction motor;

a current sensor for sensing a primary current supplied from said power conversion circuit to the induction motor;

a current component calculation circuit for calculating first and second current components from the primary current and a frequency command value of the AC primary voltage;

a magnetic flux command calculation circuit for calculating a magnetic flux command value such that an amplitude ratio between squared values of the first and second current components has a preset value, and a magnetic flux differentiation command value based on differentiation of the magnetic flux command value;

a voltage component command calculation circuit for calculating a primary voltage component command value from the frequency command value, the magnetic flux command value, and the magnetic flux differentiation command value; and a primary voltage command calculation circuit for calculating a primary voltage command value for the induction motor from the frequency command value and the primary voltage command value and for providing the primary voltage command value calculated to said power conversion circuit wherein said current component calculation circuit calculates first and second current components in phase and 90° out of phase with the primary voltage component command value, respectively.

4. The induction motor control device as claimed in claim 3, wherein said magnetic flux command calculation circuit includes a limiter circuit limiting at least one of maximum and minimum values of the magnetic flux command value.

* * * * *

UNITED STATES PATENT AND TRADEMARK OFFICE
CERTIFICATE OF CORRECTION

PATENT NO.    : 6,194,864 B1
DATED         : February 27, 2001
INVENTOR(S)   : Kinpara et al.

It is certified that error appears in the above-identified patent and that said Letters Patent is hereby corrected as shown below:

<u>Title page</u>,
Item [30], change "Sep. 29, 1999" to -- Sep. 29, 1998 --.

Signed and Sealed this

Second Day of July, 2002

Attest:

JAMES E. ROGAN
Attesting Officer            Director of the United States Patent and Trademark Office